(12) United States Patent
Wang et al.

(10) Patent No.: US 6,575,676 B2
(45) Date of Patent: Jun. 10, 2003

(54) PARALLEL STRUCTURE OF A SPATIAL 3-AXIS MACHINE TOOL WITH THREE DEGREES-OF-FREEDOM

(75) Inventors: Jinsong Wang, Beijing (CN); Xin-Jun Liu, Beijing (CN); Peiqing Ye, Beijing (CN); Guanghong Duan, Beijing (CN)

(73) Assignee: Tsinghua University, Beijing (CN)

( * ) Notice: Subject to any disclaimer, the term of this patent is extended or adjusted under 35 U.S.C. 154(b) by 36 days.

(21) Appl. No.: 09/839,613

(22) Filed: Apr. 19, 2001

(65) Prior Publication Data
US 2002/0015624 A1 Feb. 7, 2002

(30) Foreign Application Priority Data
Apr. 21, 2000 (CN) ........................................ 00105932 A

(51) Int. Cl.⁷ ................................................. B23C 1/00
(52) U.S. Cl. .................... 409/201; 409/235; 74/490.07; 74/479.01
(58) Field of Search ................................. 409/201, 235, 409/211, 216; 408/236; 74/490.05, 490.03, 479.01, 490.06, 490.01, 490.1, 490.07, 490.08, 490.09, 480 R; 901/22, 23; 248/653, 654, 631; 414/917

(56) References Cited

U.S. PATENT DOCUMENTS

| | | | |
|---|---|---|---|
| 4,976,582 A | 12/1990 | Clavel | 414/729 |
| 5,028,180 A | 7/1991 | Sheldon et al. | 409/201 |
| 5,333,514 A | 8/1994 | Toyama et al. | 74/479 |
| 5,354,158 A | 10/1994 | Sheldon et al. | 409/201 |
| 5,401,128 A | 3/1995 | Lindem et al. | 409/132 |
| 5,656,905 A | 8/1997 | Tsai | 318/568.21 |
| 5,787,758 A * | 8/1998 | Sheldon | 408/234 |
| 5,813,287 A | 9/1998 | McMurtry et al. | 74/490.06 |
| 5,901,936 A | 5/1999 | Bieg | 248/370 |
| 5,916,328 A | 6/1999 | Pritschow et al. | 74/490.03 |
| 5,941,128 A | 8/1999 | Toyama et al. | 74/490.06 |
| 5,960,672 A * | 10/1999 | Pritschow et al. | 74/490.03 |
| 6,161,992 A | 12/2000 | Holy et al. | 409/134 |
| 6,402,444 B1 * | 6/2002 | Wang et al. | 409/201 |

FOREIGN PATENT DOCUMENTS

| | | |
|---|---|---|
| WO | WO 99/38646 | 8/1999 |
| WO | WO 99/61198 | 12/1999 |
| WO | WO 00/09285 | 2/2000 |
| WO | WO 00/45991 | 8/2000 |

OTHER PUBLICATIONS

Behi, "Kinematics Analysis for a Six–Degree–of–Freedom 3–PRPS Parallel Manipulator", IEEE Journal of Robotics and Automation, vol. 4, No. 5, pp. 561–565, 1988.*

* cited by examiner

Primary Examiner—A. L. Wellington
Assistant Examiner—Erica E Cadugan
(74) Attorney, Agent, or Firm—Brinks Hofer Gilson & Lione

(57) ABSTRACT

This invention relates to the parallel structure of a spatial 3-axis machine tool with three degrees of freedom (3 DOF), which have two translational DOF and one rotational DOF. The machine tool includes a base, a mobile platform to which a tool may be attached, and three kinematic legs. Two of the three legs are in a same plane, and each have one 3-DOF spherical joint and two 1-DOF joints. The third leg has one 1-DOF joint and two universal joints. Compared with traditional machine tools, this invention possesses several advantages such as simple structure, high stiffness, low inertia, low cost, and high speed.

7 Claims, 3 Drawing Sheets

PARALLEL STRUCTURE OF A SPATIAL 3-AXIS MACHINE TOOL WITH THREE DEGREES-OF-FREEDOM

This application claims priority under the Chinese Application No. 00105932.7 that was filed on Apr. 21, 2000.

TECHNICAL FIELD OF THE INVENTION

This present invention belongs to parallel machine tools in which kinematic legs are arranged between a base and a mobile platform in a parallel way, and specially related to a parallel structure of a spatial 3-axis machine tool with three Degrees-of-Freedom (3-DOF).

BACKGROUND OF THE INVENTION

Conventional machine tools are characterized by a serial arrangement of the feed axes. The individual axes are built one on top of the other, which the lower axis carrying the one above it. Most machine structures are based on this principle. The movement mode of the machine tools is that the cutter and workpiece move along fixed guideways. However, this mode has inherent limitations. For example, in order to maintain high stiffness and therefore high machining precision, traditional machine tools need a bulky machine body, firm columns and steadfast guideway systems, which increase weight, manufacturing cost and transporting difficulty. Moreover, the fact that the cutter can only feed along the guideway limits its machining dexterity.

Recently, Giddings and Lewis (1994) introduced a machine tool called the "VARIAX Machining Center" utilizing the Stewart platform construction with six legs connecting a mobile platform to a base. The Stewart platform has been studied extensively for use as a flight simulator and as a parallel manipulator (D. Stewart, A Platform with Six Degrees of Freedom, Proc. Institute of Mechanical Engr., London, England, Vol. 180, pp. 371–386, 1965). Other variations of the Stewart platform have also been proposed. Behi (F. Behi, Kinematics Analysis for a Six-Degree-of-Freedom 3-PRPS Parallel Manipulator, IEEE J. of Robotics and Automation, Vol. 4, No. 5, pp. 561–565, 1988.) described a 6-DOF configuration with three legs where each leg consists of a PRPS chain. Hudgens and Tesar (J. Hudgens and D. Tesar, A Fully-Parallel Six Degree-of-Freedom Micromanipulator: Kinematics Analysis and Dynamic Model, Proc. 20' Biennial ASME Mechanisms Conf., Vol. 15-3, pp. 29–38, 1988.) investigated a device with six inextensible legs where each leg is driven by a four-bar mechanism mounted on the base. Pierrot, et al. studied a parallel manipulator using spatial parallelograms (F. Pierrot, Reynaud, and A. Fournier, "DELTA: A Simple and Efficient Parallel Robot," Robotica, Vol. 8, pp. 105–109, 1990). Most of these six-DOP parallel manipulators with the Stewart platform consist of six legs connecting a mobile platform to a fixed base by spherical joints. These six-legged manipulators have the following disadvantages:

1. their direct kinematic problems are difficult to solve;
2. position and orientation of their mobile platform are coupled;
3. their workspace is relatively small;
4. they have limited dexterity and small tilting angles; and
5. there is an inherent danger of strut collision.

Many parallel machine tools utilize the Stewart platform construction. For example, in EMO '97 more than ten parallel machine tools are disclosed which have been developed by universities and companies. These tools have the above disadvantages. Most are based on the 6-DOF Stewart platform to achieve five-axis motion. This increases problems associated with kinematics, dynamics, calibration and cost. Recently, parallel machine tools having less than 6 DOF (e.g. 3-DOF) have been developed by many universities and companies. For example, a three axis parallel machine with three translational DOF is disclosed by Mori E. and Iwabuchi H., (Prallel Mechanism Drilling Machine (three degrees of freedom), ditto, 1997). Additionally, three axis parallel machines with 3-DOF have been developed by the University of Hannover, ETH, ISW, and Hitachi Seiki. However, these 3-DOF parallel machine tools only achieve three translational DOF, and lack flexibility in orientation making the machining process more difficult.

SUMMARY OF THE INVENTION

It is an object of the invention to provide a new and improved parallel structure of a spatial 3-DOF machine tool with two translational DOF and one rotational DOF, whose tilting angle can reach ±45°, and can sufficiently meet the user's demand for three- to five-axis machine tools.

A further object of the invention is to provide a new and improved parallel structure of a spatial 3-DOF machine tool with parallel strut construction for greater rigidity and stiffness.

Another object of the invention is to provide a new and improved parallel structure of a spatial 3-DOF machine tool having low mass thereby enabling high dynamics.

Yet another object of the invention is to provide a new and improved parallel structure of a spatial 3-DOF machine tool having a favorable ratio of mass to be moved versus carrying capability.

A further object of the invention is to provide a new and improved parallel structure of a spatial 3-DOF machine tool having a favorable ratio of dexterity versus tilting angle.

Another object of the invention is to provide a new and improved parallel structure of a spatial 3-DOF machine tool having a vertical or horizontal machine tool frame.

The invention discloses a 3-axis parallel machine tool with two translational DOF and one rotational DOF. Disclosed is a base, a mobile platform to which a tool may be attached, and three kinematic legs. The first and second kinematic legs are in the same plane. Each of the first and second legs has one 3-DOF spherical joint and two 1-DOF joints. The third kinematic leg has one 1-DOF joint and two universal joints. The mobile platform and tool have two translational DOF in the plane defined by the first and second legs, and a rotational DOF with respect to the axis defined by the two joints which connect the first and second legs to the mobile platform.

In one embodiment of the invention, the three legs preferably are constant length struts. Each of the 1-DOF joints consists of a guideway and a slider. The guideway is mounted on the base. The slider can slide along the guideway. The struts comprising the first and second legs are connected to the sliders through revolute joints, and to the mobile platform through spherical joints. The third strut comprising the third leg is connected to the slider and to the mobile platform through universal joints.

In another embodiment of the invention, the three legs in the machine tool preferably are length-variable struts. The struts comprising two of the three legs are connected to the base through revolute joints, and to the mobile platform through spherical joints. The third strut comprising the third leg is connected to the base and to the mobile platform through universal joints.

In yet another embodiment of the invention, the first and second legs preferably are constant length struts. Each of the 1-DOF joints consists of a guideway and a slider. The guideway is mounted on the base. The slider can slide along the guideway. The struts comprising the first and second legs are connected to the sliders through revolute joints, and to the mobile platform through spherical joints. The third leg preferably is a length variable strut. The third leg is connected to the base and to the mobile platform through universal joints.

In another embodiment of the invention, the first and second legs in the machine tool preferably are length variable struts. The struts of the two legs are connected to the base through revolute joints, and to the mobile platform through spherical joints. The third leg preferably is a constant length strut. The 1-DOF joint of the third leg consists of a guideway and a slider. The guideway is mounted on the base. The slider can slide along the guideway. The strut is connected to the slider and to the mobile platform through universal joints.

These and other objects, advantages, and features of the invention will become more apparent from the following description taken in conjunction with the accompanying drawings.

DETAILED DESCRIPTION OF THE INVENTION

This application claims priority from Chinese patent application No. 00105932.7 filed on Apr. 21, 2000.

In relation to the drawings, four preferred embodiments of the invention will be described.

Figure 1:
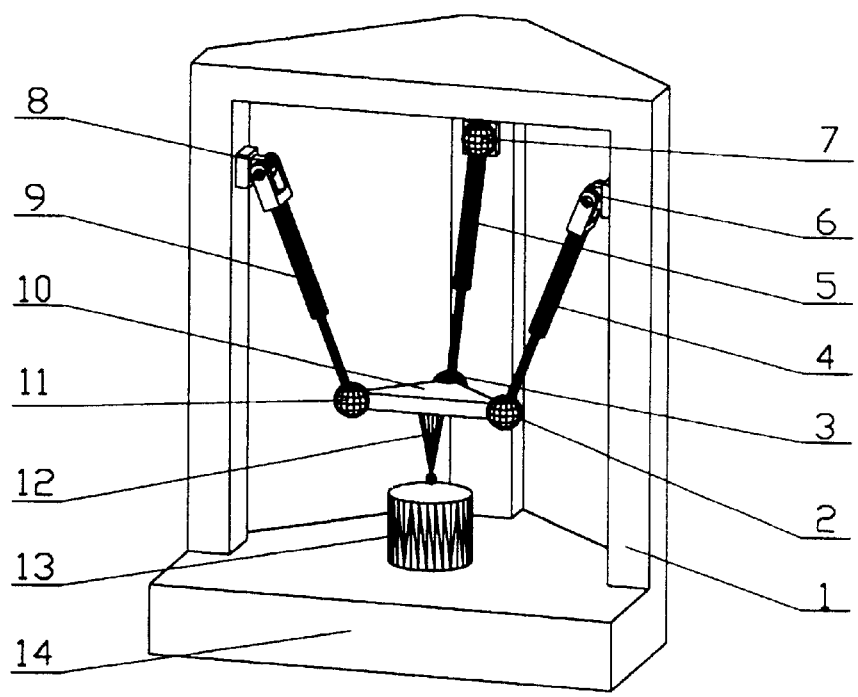
FIG. 1 is a perspective view for a parallel structure of a spatial 3-DOF machine tool for one embodiment of the invention.

The construction of a first preferred embodiment is shown in FIG. 1, which has a vertical machine tool frame. The mobile platform 10 is connected to the base, which is comprised of frame 1 and bed 14, by three length variable struts ("struts" are also referred to throughout the invention as "legs") 4, 5, and 9. The first strut 4 and the second strut 9 are connected to mobile. platform 10 by spherical joints 2 and 11 respectively, and are connected to frame 1 by revolute joints 6 and 8 respectively. The third strut 5 is connected to mobile platform 10 and frame 1 by two universal joints 3 and 7, respectively. A tool 12 is attached to mobile platform 10. A workpiece 13 is mounted on bed 14. The motions of mobile platform 10 and tool 12 is accomplished by the controlled length variable struts 4, 5 and 9, which have two translational DOF in the plane defined by struts 4 and 9, and a rotational DOF with respect to the axis defined by joints 2 and 11.

Figure 2:
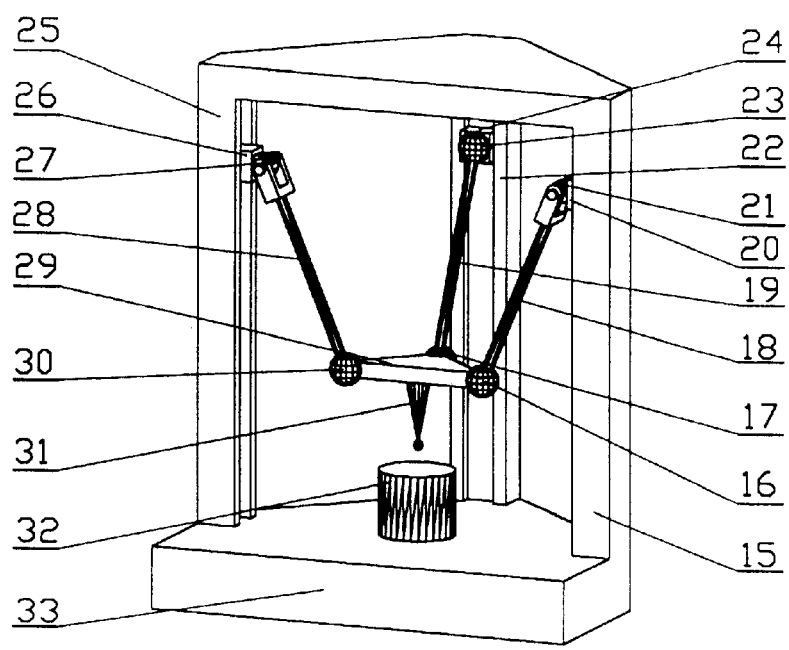
FIG. 2 is a perspective view for a parallel structure of a spatial 3-DOF machine tool for another embodiment of the invention.

The construction of a second preferred embodiment is shown in FIG. 2, which has a vertical machine tool frame. The mobile platform 29 is connected to the base, which is comprised of three guideways 15, 22, 25 and a bed 33, by three constant length struts 18, 19, and 28. The first strut 18 and the second strut 28 are connected to mobile platform 29 by spherical joints 16 and 30 respectively, and connect to sliders 20 and 26 by revolute joints 21 and 27 respectively. Sliders 20 and 26 are mounted on guideways 15 and 25. The third strut 19 is connected to mobile platform 29 and slider 24 by universal joints 17 and 23, respectively. Slider 24 is mounted on guideway 22. A tool 31 is attached to mobile platform 29. A workpiece 32 is mounted on bed 33. The motions of mobile platform 29 and tool 31 are accomplished by the movements of sliders 20, 24, and 26, which have two translational DOF in the plane defined by struts 18 and 28, and a rotational DOF with respect to the axis defined by joints 16 and 30.

Figure 3:
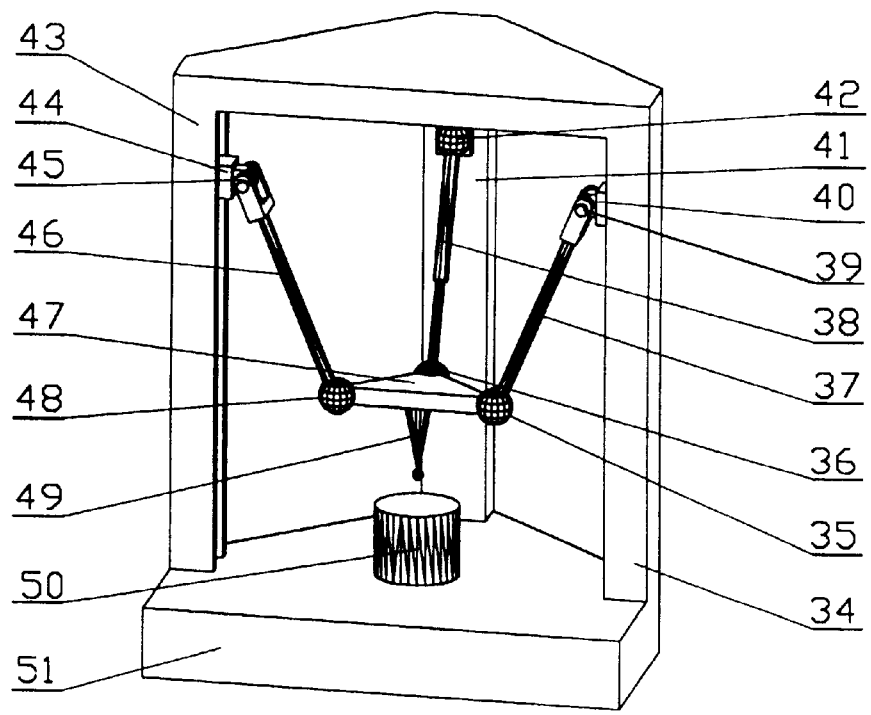
FIG. 3 is a perspective view for a parallel structure of a spatial 3-DOF machine tool for yet another embodiment of the invention.

The construction of a third preferred embodiment is shown in FIG. 3, which has a vertical machine tool frame. The mobile platform 47 is connected to the base, which is comprised of plate 41, guideways 34, 43, and bed 51, by three struts 37, 38, and 46. The first and second struts of constant length 37 and 46, respectively, are connected to mobile platform 47 by spherical joints 35 and 48, respectively, and connect to sliders 40 and 44 by revolute joints 39 and 45, respectively. Sliders 40 and 44 are mounted on guideways 34 and 43. The third strut of variable length 38 is connected to mobile platform 47 and plate 41 by universal joints 36 and 42, respectively. A tool 49 is attached to mobile platform 47. A workpiece 50 is mounted on bed 51. The motions of mobile platform 47 and tool 49 are accomplished by the movements of sliders 40 and 44 and controlled length variable strut 38, which have two translational DOF in the plane defined by struts 37 and 46, and a rotational DOF with respect to the axis defined by joints 35 and 48.

Figure 4:
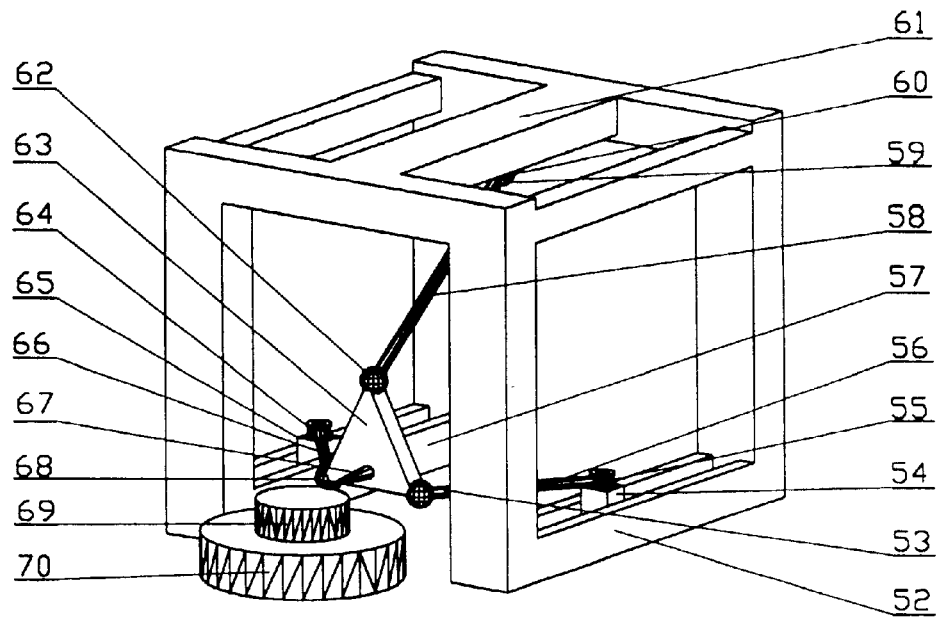
FIG. 4 is a perspective view for a parallel structure of a spatial 3-DOF machine tool for another embodiment of the invention.

The construction of a fourth preferred embodiment is shown in FIG. 4, which has a horizontal machine tool frame. The mobile platform 63 is connected to the base, which is comprised of guideways 52, 61, 57 and bed 70, by three constant length struts 56, 58, and 66. The first and second struts 56 and 66 are connected to mobile platform 63 by spherical joints 53 and 68, respectively, and connect to sliders 54 and 65 by revolute joints 55 and 64, respectively. Sliders 54 and 65 are mounted on guideways 52 and 57. The third strut 58 is connected to mobile platform 63 and slider 60 by universal joints 62 and 59, respectively. Slider 60 is mounted on guideway 61. Tool 67 is attached to mobile platform 63. Workpiece 69 is mounted on bed 70. The motions of mobile platform 63 and the tool 67 are accomplished by the movements of sliders 54, 60, and 65, which have two translational DOE in the plane defined by struts 56 and 67, and a rotational DOE with respect to the axis defined by joints 53 and 68.

Figure 5:
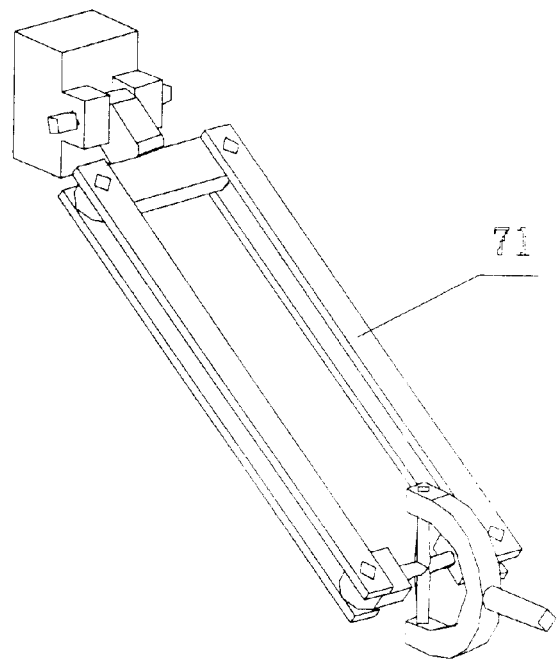
FIG. 5 is a perspective view for the third kinematic leg of the spatial 3-DOF machine tool for preferred embodiments of the invention.
Figure 6:
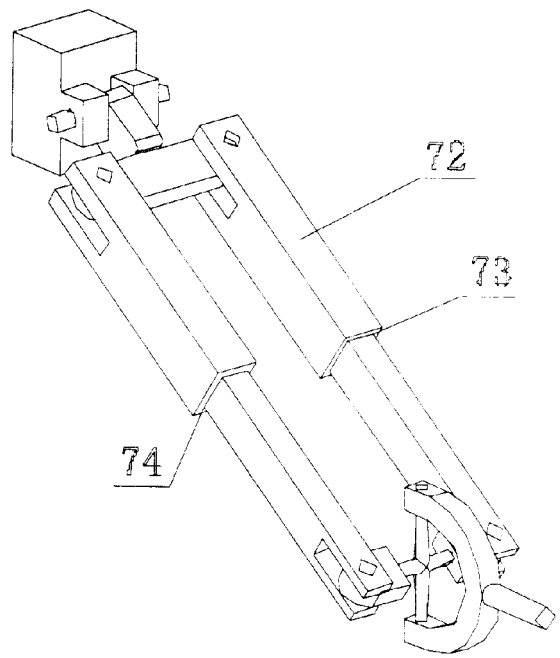
FIG. 6 is another perspective view for the third kinematic leg of the spatial 3-DOF machine tool for other preferred embodiments of the invention.

The perspective views for the third kinematic strut of the spatial 3-DOF machine tool according to preferred embodiments of the invention are shown in FIGS. 5 and 6. The structure of the third strut of constant length is shown in FIG. 5, and the structure of the third strut of variable length is shown in FIG. 6. In FIG. 5, the third strut is composed of a parallelogram mechanism 71. The four edges of parallelogram mechanism 71 are connected to each other by four revolute joints respectively. The third strut has one 1-DOF joint which is in the form of a guideway and a slider, and two universal joints. One universal joint is composed of two revolute joints in the upper edges of the parallelogram mechanism 71 and a revolute joint connecting to the base, and the other universal joint is composed of two revolute joints in the lower edges of the parallelogram mechanism 71 and revolute joints connecting to the platform. Comparing with FIG. 5, the third strut in FIG. 6 differs with that of FIG. 5 in that the two side edges of parallelogram mechanism 72 are length-variable controlled stems which have two driver units 73 and 74 respectively. The driver units 73 and 74 must drive the stems synchronously in order to maintain parallelogram mechanism, and the one 1-DOF joint is in the form of side edges of variable length.

Although the invention has been particularly shown and described with reference to preferred embodiments thereof, it will be understood by those skilled in the art that various changes in form and detail may be made therein without departing from the spirit and scope of the invention. As such, it is intended that the foregoing detailed description be regarded as illustrative rather than limiting, and that the appended claims, including all equivalents thereof, are intended to define the scope of the invention.

What is claimed is:

1. A parallel structure of a spatial 3-degrees-of-freedom machine tool with two translational degrees-of-freedom and one rotational degree-of-freedom, including:

a base;

a mobile platform to which a tool may be attached; and three kinematic legs, comprising first, second, and third kinematic legs, wherein said mobile platform is connected to said base through said three legs, the first and second legs are in a same plane, each of the first and second legs has one 3-degrees-of-freedom spherical joint and two 1-degree-of-freedom joints, the third leg has one 1-degree-of-freedom joint and two universal joints, and the motions of said mobile platform and tool are two translational degrees-of-freedom in the plane defined by the first and second legs, and a rotational degree-of-freedom with respect to an axis defined by the two joints which connect the first and second legs to said mobile platform.

2. The parallel machine tool in accordance with claim 1, wherein said three legs are three constant length struts, one of said 1-degree-of-freedom joints of said first and second legs and said 1-degree-of-freedom joint of said third leg are each composed of a guideway and a slider, said guideways are connected to said base, and said sliders are mounted on said guideways, the other 1-degree-of-freedom joint of each of the first and second struts is a revolute joint connected to said sliders of said first and second struts, and each of the first and second struts is connected to said mobile platform by a spherical joint, and the third strut is connected to its respective slider and to said mobile platform by universal joints.

3. The parallel machine tool in accordance with claim 1, wherein said machine tool has a vertical machine tool frame.

4. The parallel machine tool in accordance with claim 1, wherein said machine tool has a horizontal machine tool frame.

5. A parallel structure of a spatial 3-degrees-of-freedom machine tool with two translational degrees-of-freedom and one rotational degree-of-freedom, including:

a base;

a mobile platform to which a tool may be attached; and three kinematic legs comprising first, second, and third kinematic legs, wherein said mobile platform is connected to said base through said three legs, the first and second legs are in a same plane, each of the first and second legs has one 3-degrees-of-freedom spherical joint and two 1-degree-of-freedom joints, the third leg includes a parallelogram mechanism and has one 1-degree-of-freedom joint and two universal joints, said parallelogram mechanism having upper edges that are connected to the base and lower edges that are connected to said mobile platform, said one 1-degree-of-freedom joint is in the form of a guideway and a slider having side edges, one of the universal joints is composed of two revolute joints in the upper edges of the parallelogram mechanism and a revolute joint connecting to the base, and the other universal joint is composed of two revolute joints in the lower edges of the parallelogram mechanism and revolute joints connecting to the platform, whereby the motion of said mobile platform and tool are two translational degrees-of-freedom in a plane defined by the first and second legs and a rotational degree-of-freedom with respect to an axis defined by the two joints which connect the first and second legs to said mobile platform.

6. A parallel structure of a spatial 3-degrees-of-freedom machine tool with two translational degrees-of-freedom and one rotational degree-of-freedom, including:

a base;

a mobile platform to which a tool may be attached; and three kinematic legs, comprising first, second, and third kinematic legs, wherein said mobile platform is connected to said base through said three legs, the first and second legs in a same plane, each of the first and second legs has one 3-degrees-of-freedom spherical joint and two 1-degree-of-freedom joints, the third leg is a variable length leg that has two universal joints that connect it to the base and to the mobile platform, and the motions of said mobile platform and tool are two translational degrees-of-freedom in the plane defined by the first and second legs, and a rotational degree-of-freedom with respect to an axis defined by the two joints which connect the first and second legs to said mobile platform.

7. A parallel structure of a spatial 3-degrees-of-freedom machine tool with two translational degrees-of-freedom and one rotational degree-of-freedom, including:

a base;

a mobile platform to which a tool may be attached; and three kinematic legs, comprising first, second, and third kinematic legs, wherein said mobile platform is connected to said base through said three legs, the first and second legs are constant length legs that are in a same plane, each of the first and second legs has one 3-degrees-of-freedom spherical joint and two 1-degree-of-freedom joints, the third leg is a length variable leg which is connected to said base and to said mobile platform by universal joints, and the motions of said mobile platform and tool are two translational degrees-of-freedom in the plane defined by the first and second legs, and a rotational degree-of-freedom with respect to an axis defined by the two joints which connect the first and second legs to said mobile platform.

* * * * *